June 17, 1952  E. J. HRDLICKA, JR  2,600,875
SILENT RELIEF VALVE FOR HYDRAULIC SYSTEMS
Filed Dec. 6, 1946
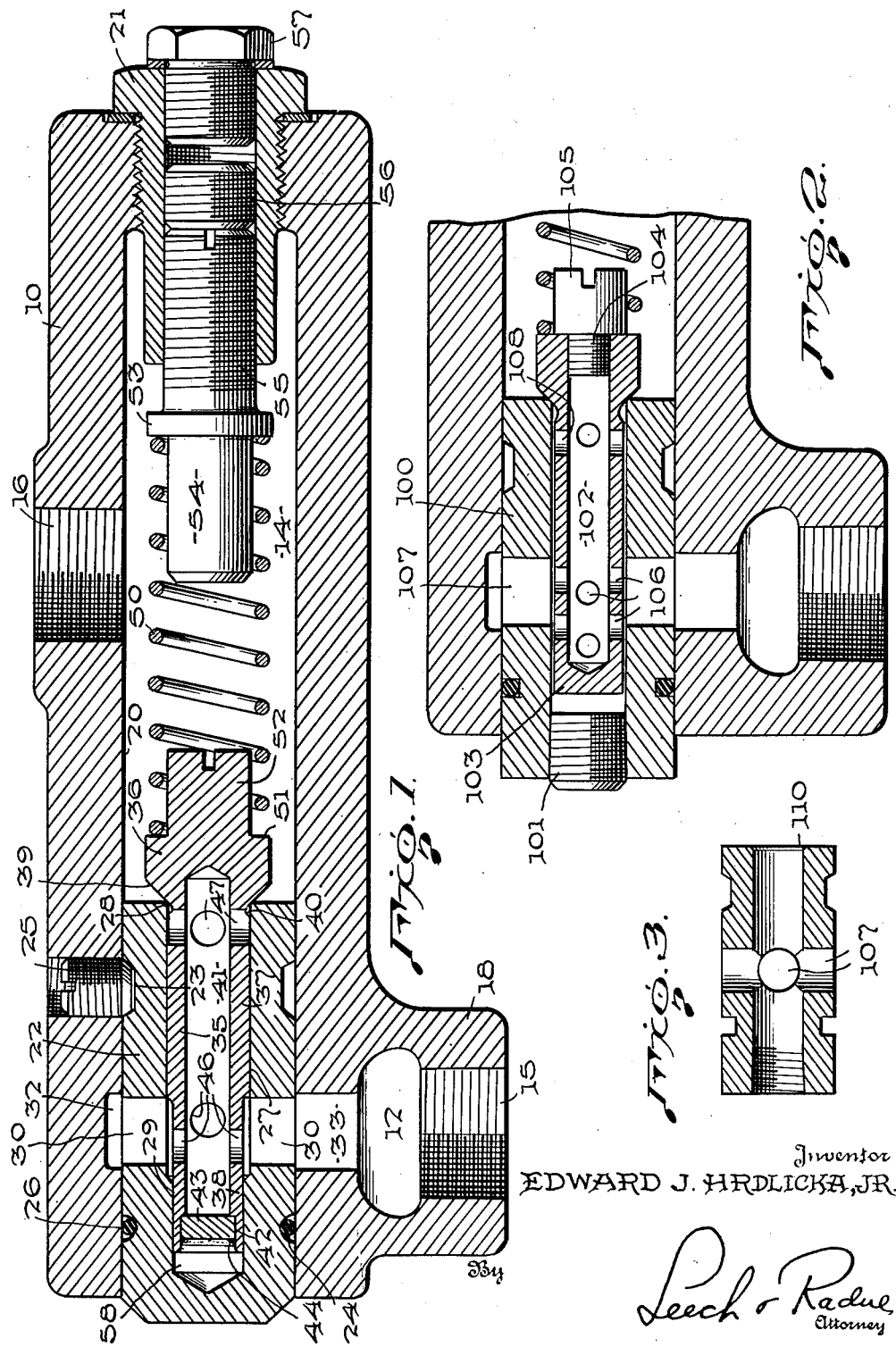
Inventor
EDWARD J. HRDLICKA, JR.
By
Leech & Radue
Attorney Patented June 17, 1952

2,600,875

UNITED STATES PATENT OFFICE 2,600,875

SILENT RELIEF VALVE FOR HYDRAULIC SYSTEMS

Edward J. Hrdlicka, Jr., Painesville, Ohio, assignor to Hydraulic Equipment Company, Cleveland, Ohio, a corporation of Ohio Application December 6, 1946, Serial No. 714,585

4 Claims. (Cl. 137—53)

This invention relates to relief valves, and more particularly to silent or safety type relief valves primarily intended for use in high pressure hydraulic systems.

It is a general object of the present invention to provide a novel and improved relief valve for hydraulic systems.

More particularly it is an object of the invention to provide a relief valve of extreme ruggedness and simplicity in construction and one having a long life, which will be entirely silent under all conditions of operation and/or installation.

The novel features of the invention may be enumerated as including a lack of chattering, vibration, squealing or the like resulting at least partially from the slow opening and slow closing occurring under all conditions; simple operation and tight closing resulting from a substantially double seating or sealing effect; extreme smoothness of relief due to a gradual opening through a plurality of successively uncovered overlapping ports; full cushioning action in both opening and closing and a built-in integral dash pot requiring no additional parts.

A further important feature of at least one embodiment of the invention resides in a safety arrangement whereby relief is effected in spite of a broken spring.

Still another important feature of the invention resides in the balanced, radial, high pressure inlet to the interior of the valve stem at a position intermediate the seat or discharge opening and the dash pot.

Other and further features and objects of the invention will be more apparent to those skilled in the art upon a consideration of the accompanying drawings and following specification, wherein are disclosed two exemplary embodiments of the invention, with the understanding that such changes and modifications may be made therein as fall within the scope of the appended claims without departing from the spirit of the invention.

In said drawings:

Fig. 1 is a longitudinal central section through the preferred embodiment of a silent relief valve constructed in accordance with this invention;

Fig. 2 is a fragmentary longitudinal central section through a second embodiment of the same; and Fig. 3 is a longitudinal central section of the removable valve seat element.

Most relief valves, and particularly those associated with high pressure liquids such as used in the hydraulic operation of machinery, earthmoving equipment, hoists and the like, have a common fault. They chatter when open. This is usually noticeable as an unpleasant high-pitched noise and sometimes is the means of setting up vibrations in the hydraulic system which in time cause leaks or premature failure of piping or other parts of the system. The noise is disagreeable, but the vibration is destructive and both should be eliminated. It has been found that one of the major contributing factors to chattering is the abruptness of opening and/or of closing of the conventional relief valve which permits inertia effects in the spring, setting up unbalance conditions resulting in rapid pulsation of the valve plunger or closure member. Thus on rapid opening the spring is compressed beyond the amount which it would normally be moved, an inertia moment is set up which then tends to close the valve against the flowing liquid. Sometimes the valve member is moved as far as the seat on this initial recoil operation but at other times only partakes of slight movement which becomes enhanced as time increases until a distinct chattering results from the high speed hammering of the closure member on the seat. This eventually destroys the seat area and causes leakage in addition to the difficulties mentioned above.

The present invention provides for slow speed opening and closing which permits an inherent damping of the spring to reduce the mentioned inertia effects. At the same time the liquid is discharged in a direction at right angles to the direction of movement of the closure member, thereby helping in the damping action. There is nothing about the present valve and its associated parts which can start the well known fluttering action which so often results when high speed fluids flow over sharp edges or divide over the two surfaces of a plate or sheet.

To further provide against any vibration or fluttering action the valve seat element and the valve plunger element are simply modified to provide a dash pot without the use of any additional parts. The dash pot is extremely effective in slowing both the opening and closing actions of the valve without reducing the effective area against which the high pressure operates to open the valve if the pressure is excessive.

The invention may take many forms, two of which have been illustrated in the drawings as the most elementary embodiments for using the invention for they illustrate separate housings intended for piping into any conventional hydraulic system in a manner well known. Obviously the elements of the valve may be incorporated in other parts of the hydraulic equipment as, for instance, the housing of a control valve or valves, the housing of a pump, the base of a reservoir or tank, or in connection with other elements desired to be protected against excess pressures resulting from any cause whatsoever.

Referring now to Fig. 1 of the drawings, there is shown at 10 a cast metal housing for the valve provided with a high pressure chamber 12 and a low pressure chamber 14. The high pressure chamber is fitted with a port 15 threaded to receive a pipe from any source of high pressure liquid, while the low pressure or discharge chamber 14 is fitted with a port 16 threaded to receive a pipe leading to the tank or reservoir for the low pressure liquid supplying the inlet to the pump. The housing 10 is generally cylindrical in form, with the lateral offset 18 containing the high pressure chamber, is provided with a cored or bored axial opening 20 extending the full length of the housing. One end of this opening is closed by a threaded-in plug 21. The other end of the housing bore is accurately sized and smoothly finished to receive with a pressed fit, the seat member 22 forming a partition between the two chambers and comprising a cylindrical plug of metal whose outside is sized to closely fit the walls of the bore to prevent longitudinal leakage. Two circumferential grooves 23 and 24 in the cylindrical surface of the seat member accommodate respectively the set screw 25 for locking the seat member in position and the sealing ring 26 to insure against longitudinal leakage. The set screw, whose end is preferably sunk beneath the surface of the housing, insures against any looseness of the seat due to temperature changes.

The seat member is provided with a stepped bore, the larger diameter 27 of which extends through the end facing into the chamber 14, where it is slightly chamfered as at 28 to provide a suitably inclined seat. The bore does not extend through the closed left end of the seat member, but the reduced diameter 29 stops an appropriate distance therefrom, as shown. On the larger diameter side of the shoulder at the junction of bores 27 and 29 are a plurality of radial openings 30, here shown as four in number, spaced ninety degrees apart and each of substantially the same diameter as the bore 27. Their outer ends register with a circumferential enlargement 32 in the housing, which is connected by passage 33 to high pressure chamber 12, whereby liquid has access to the bore in the seat element.

The valve plunger comprises a cylindrical stem 35 and head 36 formed integral. The stem 35 is of two diameters the major portion 37 having just an easy sliding fit in the larger bore 27 in the seat element. The clearance is just sufficient to prevent sticking under any temperature conditions and allows for a slight amount of longitudinal leakage. The smaller diameter 38 has a corresponding fit in the smaller bore 29 in the seat element, and the smaller diameter of the stem extends from the left end to just beyond the radial openings 30 in the seat when the tapered under surface 39 in the head 36 rests on the seat 28 as shown. This conical or tapered surface 39 of the head is carried slightly inside of the cylindrical surface of the stem to provide the undercut 40 which insures adequate removal of metal at this junction point and clears the seat for a better fit. The valve plunger stem is bored from the left end with a stepped bore, the smaller diameter portion 41 extending up into the head while the larger diameter portion 42 is quite shallow and serves to receive the closure plug 43, which may be welded into position as shown at 44 to insure fluid tightness.

The chamber thus formed in the valve stem is open at two spaced points through the wall thereof. To admit the high pressure liquid into this chamber radial bores 46, preferably four in number, are provided as shown. These are just slightly less in diameter than the diameter of the chamber and may be staggered somewhat within the length spanned by the radial openings 30 in the seat, when the stem is in the closed position. Like sized bores 47, all in the same radial plane, as shown, or staggered somewhat as seen in Fig. 2, provide for exit of the liquid when the valve is opened. These holes are just beneath the junction of the head and stem.

The valve plunger is maintained on its seat by a suitable helical spring 50 arranged in the low pressure chamber 14 and seating on the annular area 51 surrounding the central stud 52 on the head 36. The opposite end of the spring abuts the flange 53 on the spring guide and centering means 54, which has a threaded stem 55 received in a suitable threaded bore in the plug 21. This stem is kerfed to receive a screw driving device for adjustment. A short screw 56 provides for locking it in position and a cap or plug 57 is threaded into the end of cap 21 and gasketed like the cap to prevent leakage. Thus the tension of the spring may be adjusted to suit the desired relief pressure conditions.

In operation the high pressure liquid in chamber 12 has access to the interior of the valve stem at all times. The two diameters of the stem insure full access of the high pressure liquid to the radial ports 46 through the stem wall at all positions of the stem. Even should the spring break and the plunger be forced to the right until stopped by the spring guide 54, liquid can pass up around the small diameter of the stem and between it and the larger bore of the seat element and enter the passages 46 to be discharged through 47 into the low pressure chamber.

This liquid also gains access to small chamber 58 at the left end of the seat bore through the leakage clearance between 38 and 29. As the pressure increases beyond the setting of the spring the whole area of the stem is effectively acted on by the high pressure and the valve begins to open. The dash pot action of 38 and 29 causes a slow movement, and the lifting of the head 36 from the seat permits a slow seepage around the stem portion 37 and through the holes 47 into the low pressure chamber 14. As the valve opens further more and more of the areas of the apertures 47 are uncovered as they are exposed above the seat and gradually the full effective flow of the valve is achieved when these openings are completely uncovered. The flow from them is radial and divides the stream into four parts, serving to reduce the noise of flow and to act as a cushion to prevent closing too rapidly. Any tendency on the part of the valve to flutter is quickly damped out by the effective dash pot action of the small diameter portion 38 of the valve stem working in the closed chamber 58 at the far end of the seat element. During the opening operation of the valve the small quantity of seepage around the stem effected with the head clearing the seat but the openings 47 still eclipsed does not sufficiently relieve the pressure beneath the stem so as to offer a tendency for the valve to snap closed. This eliminates one of the first causes of chattering in the usual type valve. The valve is achieving its full opening requires a much larger movement of the plunger than in the conventional types of relief valves which steadies the spring action to reduce inertia effects largely responsible for chattering in other types of valves. The loose fit between the stem and bore eliminates any chance for sticking due to increased temperatures. This is permissible because the final sealing against leakage is effected by the head on the narrow seat. The dash pot action is achieved because of the easy sliding fit of 38 in 29, which requires a slow motion of the stem in either direction to permit the requisite flow of liquid through this narrow space into and out of chamber 58 to permit lifting or seating of the valve.

In Fig. 2 is shown a slight modification. Here the housing may be identical with that in Fig. 1 and the seat element only slightly different. In this case this element 100 is drilled entirely through and its outer end is threaded and closed by a plug 101. The stem of the valve plunger as well as the bore of the seat element is of a single diameter, as shown. The chamber 102 in the valve plunger is drilled from the head end so that the dash pot end 103 of the stem is solid, as shown. To prevent leakage through the head it is closed by a threaded plug 104 integral with the enlarged stud 105 which forms a centering end guiding member for the spring.

Since the valve stem is of uniform diameter there is provided an increased number of radial ports 106 through the same to cooperate with the radial openings 107 in the seat element, whereby liquid is supplied to the interior of the stem in all normal working positions of the plunger. Just beneath the head the radial passages 108 in the stem wall are shown as arranged in echelon to insure their sequential opening as the plunger is lifted.

In Fig. 3 the seat element of Fig. 2 is shown in detail. This view principally illustrates the fact it is a single piece and is not separated by the radial openings 107, which provide access to its bore. The seat 110 is clearly shown as having a chamfered edge of slight width to provide high unit pressure resulting from the spring to thus insure against leakage even after long usage.

I claim:

1. A silent relief valve for hydraulic systems comprising in combination, a housing having an inlet chamber and a discharge chamber; a partition separating said chambers and having a deep bore open at one end to the discharge chamber and closed at the opposite end; a passage from the inlet chamber intersecting said bore remote from its ends; a plunger having a cylindrical stem with an easy sliding fit in said bore throughout substantially all of the bore length, and a head having a conical undersurface adapted to seat at the discharge end of the bore; a spring biasing said plunger to seat said head, said stem having a longitudinal bore closed at both ends, a radial port from said stem bore through the wall thereof for continuous cooperation with said passage and a radial discharge port through the stem wall sufficiently below the head to remain covered by the bore wall during initial opening movement of the plunger head.

2. The relief valve of claim 1 in which additional radial discharge ports through the stem wall are arranged in echelon around the stem for progressive opening.

3. The relief valve as defined in claim 1 in which the said bore and stem each have interfitting portions of two different diameters, the larger being adjacent said head and in which the small stem diameter extends beyond the first port and the large bore diameter extends beyond said passage.

4. A silent relief valve for hydraulic systems comprising in combination, a housing having an inlet chamber and a discharge chamber, a removable cylindrical partition separating said chambers and having a first bore open to the discharge chamber and a lesser diameter extension closed at the opposite end, passages from the inlet chamber entering said first bore adjacent the extension, a plunger having a hollow stem portion having an easy sliding fit in said bore and a closed end section having an easy sliding fit in said extension, a head closing the end of said stem and adapted to seat at the discharge end of the bore, a spring biasing said plunger to seat the head, ports through the stem extension wall cooperating with said passages and ports through said stem wall just below said head.

EDWARD J. HRDLICKA, Jr.

REFERENCES CITED

The following references are of record in the file of this patent:

UNITED STATES PATENTS

| Number | Name | Date |
| --- | --- | --- |
| 2,080,824 | Kane | May 18, 1937 |
| 2,134,803 | Rose | Nov. 1, 1938 |
| 2,295,931 | Caminez | Sept. 15, 1942 |
| 2,388,406 | Haberland | Nov. 6, 1945 |
| 2,411,930 | Mathys | Dec. 3, 1946 |